Figure 9:
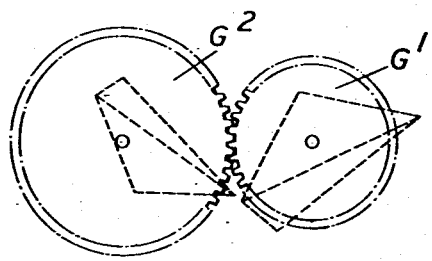
Figure 10:
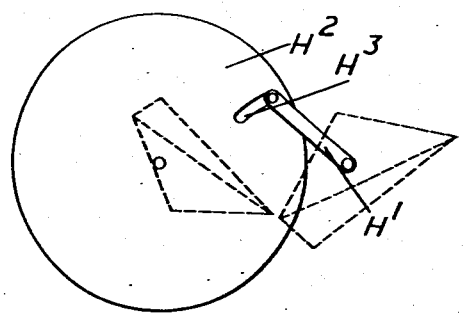

Oct. 22, 1957  K. R. COLEMAN  2,810,323
ANAMORPHOTIC OPTICAL SYSTEMS
Filed May 17, 1954  3 Sheets-Sheet 1
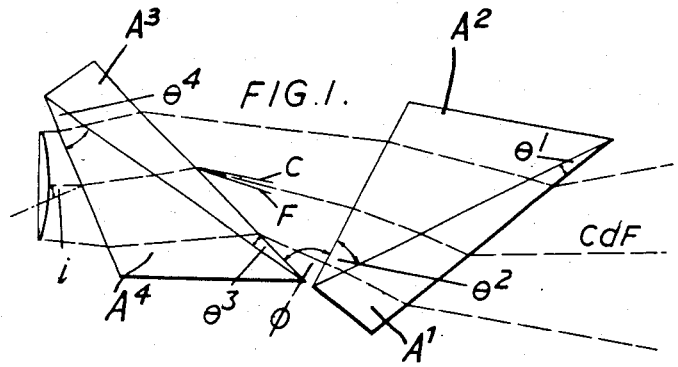
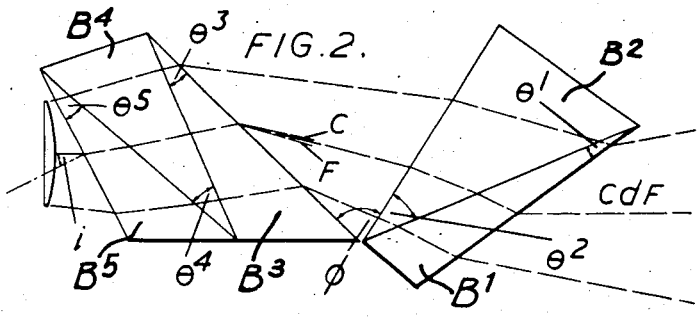
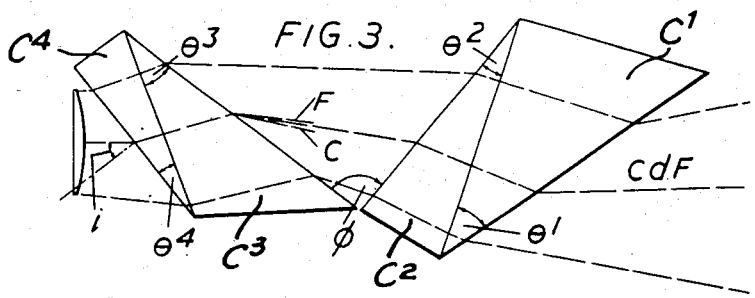
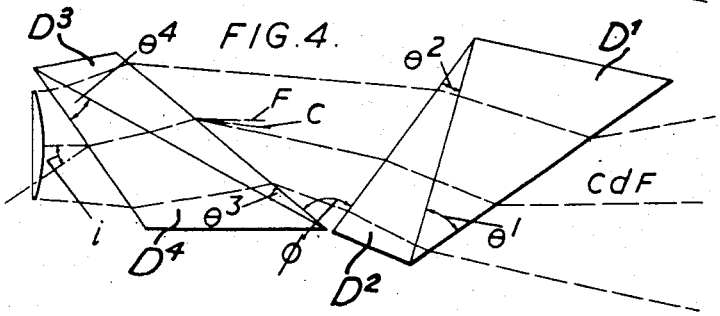
Inventor
Kenneth R. Coleman
By
Attorneys

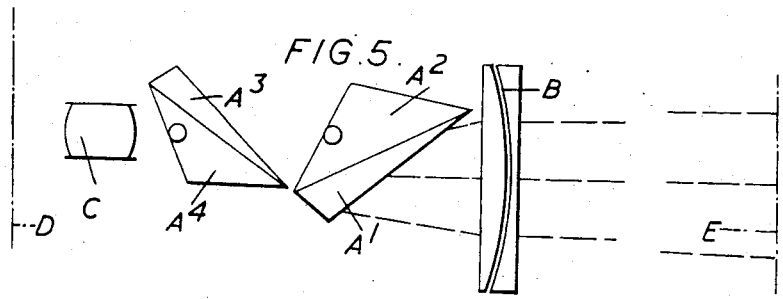
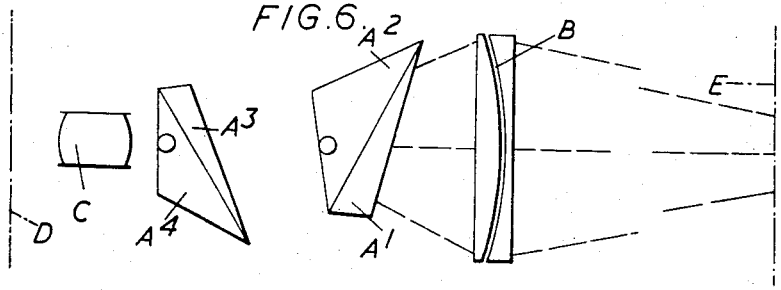
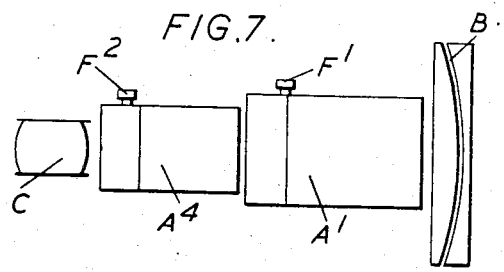
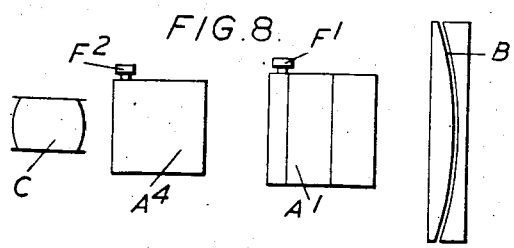

Oct. 22, 1957  K. R. COLEMAN  2,810,323
ANAMORPHOTIC OPTICAL SYSTEMS
Filed May 17, 1954  3 Sheets-Sheet 3

Inventor
Kenneth R. Coleman
By
Attorneys

United States Patent Office

2,810,323
Patented Oct. 22, 1957

---

2,810,323

ANAMORPHOTIC OPTICAL SYSTEMS

Kenneth Roy Coleman, Leicester, England, assignor to Taylor, Taylor & Hobson Limited, Leicester, England, a British company Application May 17, 1954, Serial No. 430,311

Claims priority, application Great Britain October 28, 1953

20 Claims. (Cl. 88—57)

This invention relates to an anamorphotic optical system, comprising two refracting compound prisms so arranged that an incident ray will be deviated in one sense by the first compound prism and in the reverse sense by the second compound prism. The total deviation of an incident ray by such a system will depend on its angle of incidence on the first surface, and the term "axial ray" is herein used to denote a ray which emerges from the system parallel to its direction of incidence. It is to be noted that an incident collimated beam composed of axial rays will not only be deviated by the compound prism on which it is incident, but will also be reduced (or enlarged) in cross-section, and this action will be repeated at the other compound prism, the reduction (or enlargement) of course taking place only in a plane at right angles to the generators of the prisms, the dimensions of the beam at right angles to such plane remaining unaltered. This change in width of an axial collimated beam may conveniently be termed "lateral pupil compression (or enlargement)." At the same time, the angle between two oblique incident rays will be decreased (or increased) in their passage through the system, in the operative plane at right angles to the prism generators, but will remain unaltered in a plane at right angles thereto. Such change in angle may be termed "lateral angular compression (or enlargement)," and it is particularly to be noted that lateral pupil compression and lateral angular compression are operative in opposite senses, so that a beam passing through the system in one direction will suffer lateral angular compression and lateral pupil enlargement, whilst a beam passing through the system in the opposite direction will suffer lateral angular enlargement and lateral pupil compression. It will thus be clear that the system has an overall magnification factor in the operative plane equal to the reduction in width of pupil, but leaves the dimensions and direction of a beam unaltered in the plane at right angles thereto.

In hitherto known systems of this kind correction for axial colour has been obtained by achromatising each compound prism, but such arrangements suffer rather badly in respect of oblique colour.

The present invention has for its object to provide an improved anamorphotic system of this kind wherein satisfactory correction both for axial colour and for oblique colour is achieved.

In the system according to the invention, each compound prism is arranged to depart from achromatism to such an extent that the difference between the deviations of an axial ray through the compound prism for the C and F spectrum lines lies between .01 and .1 of a degree.

When the front prism element of the front compound prism is made of a material having Abbé V number less than 45, it is preferable for the deviation of the F-ray to be greater than the deviation of the C-ray in each compound prism. In such case, the front compound prism may consist of a cemented prism pair in which the two prism elements have their apices pointing in opposite directions, the Abbé V number of the material of the rear prism element of such pair exceeding that of the associated front prism element by at least 10.

In this case, the invention may be combined with the invention forming the subject of the present applicant's copending United States of America patent application Serial No. 428,616, filed May 10, 1954, now Patent No. 2,792,751, dated May 21, 1957, according to which the rear compound prism also consists of a cemented prism pair in which the apices of the two prism elements point in opposite directions, the apices of the two inner prisms of the system pointing in the same direction, and an axial ray incident on the system from the front is deviated by the front prism pair in a sense away from the apices of the inner prism elements and by the rear prism pair in a sense towards such apices, the portion of such axial ray within each prism element being inclined to the normal to the cemented surface at an angle which exceeds by at least five degrees the angle between such ray portion and the normal to the air-exposed surface of the prism element.

On the other hand, when the front prism element of the front compound prism is made of a material having Abbé V number greater than 45, it is preferable for the deviation of the C-ray to be greater than the deviation of the F-ray in each compound prism. In such case, the front compound prism may consist of a cemented prism pair in which the two prism elements have their apices pointing in opposite directions, the Abbé V number of the material of the front prism element of such pair exceeding that of the associated rear prism element by at least 10. The rear compound prism may also consist of a cemented prism pair, in which the two prism elements have their apices pointing in opposite directions. In such case, the Abbé V number of the material of the front prism element of the rear member may exceed that of the rear prism element thereof by at least 10, the apices of the rear element of the front prism pair and of the front element of the rear prism pair both pointing away from the apex of the prismatic air space between the two prism pairs or alternatively the Abbé V number of the material of the rear prism element of the rear prism pair may exceed that of the front prism element thereof by at least 10, the apices of the front prism elements of the two prism pairs both pointing away from the apex of the prismatic air space between the two prism pairs.

In yet another alternative, the rear compound prism includes more than two prism elements, and the material of each of the outer elements thereof has Abbé V number greater than 45. Thus, the rear compound prism may consist of three prism elements, the Abbé V number of the material of each of the outer elements exceeding that of the middle element by at least 10. The two outer elements may be made of the same material.

With any of these alternatives, it is convenient to use the same two materials, with Abbé V numbers differing by more than 10, for the prism elements of one compound prism as for those of the other compound prism.

Variation of the magnification of the system may be effected by angularly adjusting the two compound prisms about axes parallel to the prism surfaces. The arrangement incorporating the invention of the copending application above mentioned is especially suitable for this purpose and enables a considerably wider range of variation of the magnification, than with the other alternatives, to be obtained. In such case, it is desirable so to choose the relative angular movements of the two prism pairs that an incident ray, which in one position of adjustment emerges parallel to its original direction, will also do so in all other positions of adjustment.

The anamorphotic system according to the invention is more especially intended or use with collimated light, and will usually therefore have a collimating optical system in front of it. Although applicable to various purposes, the arrangement according to the invention is especially suitable for cinematographic photography and projection, and renders it possible, for example, to effect lateral angular compression (without altering the vertical dimension) of the photograph of an unusually wide panoramic scene so that it can be accommodated in the ordinary picture frame area of a cinematograph film, and subsequently to effect corresponding lateral angular enlargement in the projection of such film on to a wide screen.

The invention may be carried into practice in various ways, but some convenient alternative examples of anamorphotic system according thereto are illustrated by way of example in the accompanying drawings, in which Figure 1 shows the arrangement of the prisms in the operative plane in one example, Figures 2, 3 and 4 show similar views respectively of three more examples, Figure 5 shows the system of Figure 1, in its position of highest magnification, as used for example in conjunction with a projection objective.

Figure 6 is a view similar to that of Figure 5, but showing the system in its position of lowest magnification, Figures 7 and 8 are respectively side views of the arrangements of Figures 5 and 6, and Figures 9, 10 and 11 diagrammatically illustrate three alternative forms of mechanism for inter-relating the movements of the two prism pairs.

Numerical data for these examples are given in the following tables. In each table, the first portion gives for each of the prism elements $A^1$, $A^2$, $A^3$, $A^4$, $B^1$, $B^2$, $B^3$, $B^4$, $B^5$, $C^1$, $C^2$, $C^3$, $C^4$, $D^1$, $D^2$, $D^3$ and $D^4$, respectively, counting from the front, the angles $\theta^1$, $\theta^2$, $\theta^3$ and $\theta^4$ in degrees, the refractive indices $N_C$, $N_d$ and $N_F$ respectively for the C, d and F spectrum lines of the material of which the prism element is made, and also the Abbé V number for such material. The second portion of each tables gives by way of example details of the path of one axial ray through the system, tabulating for each of the spectrum lines C, d and F the angles in degrees made by the portion of the ray within each prism element with the normal to the front surface of the element and with the normal to the rear surface of the element and also the corresponding angles in the front air space, the middle air space and the rear air space. The positive sign indicates in the case of a ray approaching the surface that the ray is on the side of the normal nearer to the "closed side" of the system (that is the side of the system towards which the apex of the prismatic air space between the two compound prism points) and in the case of a ray leaving the surface that it is on the side of the normal remote from the closed side, whilst the negative sign indicates the converse condition. The third and fourth portions of each table give similar ray trace data for two oblique rays respectively 5.25 degrees on either side of the axial ray. These ray traces are each given, by way of example, for a ray passing through the system from the rear to the front, and (where the system is adjustable) with the prisms in the position of maximum magnification within the operating range.

The first example, shown in Figure 1, incorporates the invention of the copending application above mentioned, and comprises two cemented prism pairs, wherein the apices of the two prism elements of each pair point in opposite directions and the apices of the two inner prism elements of the system both point towards the closed side of the system.

EXAMPLE I

|  | θ | $N_C$ | $N_d$ | $N_F$ | V |
|---|---|---|---|---|---|
| Prism $A^1$ | 12.0 | 1.60834 | 1.61323 | 1.62495 | 36.9 |
| Prism $A^2$ | 36.5 | 1.50727 | 1.50970 | 1.51518 | 64.4 |
| Prism $A^3$ | 10.95 | 1.60834 | 1.61323 | 1.62495 | 36.9 |
| Prism $A^4$ | 31.5 | 1.50727 | 1.50970 | 1.51518 | 64.4 |

Axial ray trace

|  | C-ray | d-ray | F-ray |
|---|---|---|---|
| Front air space | +52.8280 | +52.8221 | +52.8174 |
| Prism $A^1$ | +29.6983 | +29.5968 | +29.3603 |
|  | +41.6983 | +41.5968 | +41.3603 |
| Prism $A^2$ | +45.2198 | +45.1870 | +45.1264 |
|  | +8.7198 | +8.6870 | +8.6264 |
| Middle air space | +13.2091 | +13.1806 | +13.1360 |
|  | −59.2909 | −59.3194 | −59.3640 |
| Prism $A^3$ | −32.3148 | −32.2157 | −31.9722 |
|  | −43.2648 | −43.1657 | −42.9222 |
| Prism $A^4$ | −46.9979 | −46.9722 | −46.9150 |
|  | −15.4979 | −15.4722 | −15.4150 |
| Rear air space | −23.7500 | −23.7500 | −23.7500 |

Oblique ray trace +5.25

|  | C-ray | d-ray | F-ray |
|---|---|---|---|
| Front air space | +42.1689 | +42.1575 | +42.1409 |
| Prism $A^1$ | +24.6704 | +24.5849 | +24.3877 |
|  | +36.6704 | +36.5849 | +36.3877 |
| Prism $A^2$ | +39.5876 | +39.5600 | +39.5109 |
|  | +3.0876 | +3.0600 | +3.0109 |
| Middle air space | +4.6567 | +4.6225 | +4.5647 |
|  | −67.8433 | −67.8775 | −67.9353 |
| Prism $A^3$ | −35.1589 | −35.0471 | −34.7733 |
|  | −46.1089 | −45.9971 | −45.7233 |
| Prism $A^4$ | −50.2626 | −50.2313 | −50.1610 |
|  | −18.7626 | −18.7313 | −18.6610 |
| Rear air space | −29.0000 | −29.0000 | −29.0000 |

Oblique ray trace −5.25

|  | C-ray | d-ray | F-ray |
|---|---|---|---|
| Front air space | +63.4684 | +63.4675 | +63.4657 |
| Prism $A^1$ | +33.7990 | +33.6825 | +33.4069 |
|  | +45.7990 | +45.6825 | +45.4069 |
| Prism $A^2$ | +49.9043 | +49.8664 | +49.7916 |
|  | +13.4043 | +13.3664 | +13.2916 |
| Middle air space | +20.4516 | +20.4268 | +20.3864 |
|  | −52.0484 | −52.0732 | −52.1136 |
| Prism $A^3$ | −29.3587 | −29.2719 | −29.0580 |
|  | −40.3087 | −40.2219 | −40.0080 |
| Prism $A^4$ | −43.6526 | −43.6327 | −43.5882 |
|  | −12.1526 | −12.1327 | −12.0882 |
| Rear air space | −18.5000 | −18.5000 | −18.5000 |

This example is suitable for angular adjustment of the two compound prisms to give variable magnification and the following additional table gives data for various positions of adjustment for an axial ray passing through the system from the rear to the front, this ray, in the position of highest magnification within the range of adjustment, corresponding to that for which full data are given in the second portion of the above table. The data given in the following table comprise the angle of incidence $i$ in degrees of the ray to the normal to the rear surface of the rear prism pair, the incident ray being on the side of the normal remote from the closed side of the system, the angle $\phi$ in degrees between the rear surface of the front compound prism and the front surface of the rear compound prism, and the overall magnification M of the system.

| $i$ | $\phi$ | M |
|---|---|---|
| 23.8 | 72.5 | 1.97 |
| 20.0 | 61.1 | 1.63 |
| 15.0 | 45.4 | 1.36 |
| 0.0 | 14.0 | 1.08 |

The useful range of magnification extends from × 1.97 to × 1.08 and it is intended that stops should be provided to limit the adjustment to this range, since outside this range the aberration corrections fall away badly or the angles of incidence with some of the surfaces become impracticably large.

The prism angles are such, in relation to the refractive indices, that within the range of adjustment the portion of the axial ray within each of the prism elements is much more steeply inclined to the normal to the adjacent cemented surface than to the normal to the adjacent air-exposed surface, as will be clear from the data of the ray trace given in the second portion of the table above.

Such ray trace also shows that the deviation of the chosen axial ray through the rear compound prism approximately amounts for the C-line to 14.99 degrees and for the F-line to 15.06 degrees, giving a difference of .07 degree. This is indicated on an exaggerated scale in Figure 1 of the drawings for the axial ray by the two lines marked C and F extending from the front surface of the rear compound prism on either side of the $d$-ray, the actual angle between the C and F rays being too small to show accurately on the drawing. The ray trace also shows that the difference between the deviations of the same axial ray for the C-line and for the F-line through the front compound prism also amounts approximately to .07 degree, thus bringing the C and F rays nearly back into coincidence with the $d$-ray on final emergence from the system. It can be shown that the deviation difference for the axial ray through each compound prism between the C-line and the F-line remains between .01 and .10 degree throughout the range of adjustment.

A comparison of the third and fourth portions of the above table will show that, for the two oblique rays in question, the angle between them at incidence on the rear surface of the system is 10.5 degrees, whilst the angle between them on emergence from the front surface of the system is 21.3 degrees. This illustrates the lateral angular enlargement of the system for a beam passing through it from rear to front and is indicated by the three rays drawn in Figure 1. It can similarly be shown that the lateral pupil compression of the same beam corresponds to the magnification × 1.97 for collimated rays. The converse conditions apply to a beam passing through the system from front to rear.

In this example the same two materials are used in both compound prisms, and in each case the Abbé V number of the material used for the rear element exceeds that for the front element by 27.5.

The second example (shown in Figure 2) differs from the first in that an additional prism element is provided on the front of the rear compound prism, with its apex pointing away from the closed side. This arrangement gives a higher degree of correction for the aberrations, but is not intended to be adjustable for variable magnification. The numerical data are as follows:

EXAMPLE II

| | $\theta$ | $N_C$ | $N_d$ | $N_F$ | V |
|---|---|---|---|---|---|
| Prism B¹ | 13.03 | 1.61546 | 1.62049 | 1.63258 | 36.2 |
| Prism B² | 35 | 1.50727 | 1.50970 | 1.51518 | 64.4 |
| Air Space | 78.54 | | | | |
| Prism B³ | 22 | 1.50727 | 1.50970 | 1.51518 | 64.4 |
| Prism B⁴ | 24.83 | 1.60073 | 1.60483 | 1.61453 | 36.2 |
| Prism B⁵ | 22 | 1.50727 | 1.50970 | 1.51518 | 64.4 |

*Axial ray trace*

| | C-ray | d-ray | F-ray |
|---|---|---|---|
| Front air space | +54.3232 | +54.3207 | +54.3229 |
| Prism B¹ | +30.1882 / +43.2182 | +30.0837 / +43.1137 | +29.8391 / +42.8691 |
| Prism B² | +47.2170 / +12.2170 | +47.1893 / +12.1893 | +47.1418 / +12.1418 |
| Middle air space | +18.6000 / −59.9419 | +18.5880 / −59.9539 | +18.5838 / −59.9581 |
| Prism B³ | −35.0457 / −13.0457 | −34.9859 / −12.9859 | −34.8427 / −12.8427 |
| Prism B⁴ | −12.2717 / −37.1017 | −12.2038 / −37.0338 | −12.0401 / −36.8701 |
| Prism B⁵ | −39.8393 / −17.8393 | −39.8096 / −17.8096 | −39.7430 / −17.7430 |
| Rear air space | −27.5000 | −27.5000 | −27.5000 |

*Oblique ray trace +5.25*

| | C-ray | d-ray | F-ray |
|---|---|---|---|
| Front air space | +43.6256 | +43.6184 | +43.6225 |
| Prism B¹ | +25.2829 / +38.3129 | +25.1954 / +38.2254 | +24.9979 / +38.0279 |
| Prism B² | +41.6406 / +6.6406 | +41.6182 / +6.6182 | +41.5886 / +6.5886 |
| Middle air space | +10.0380 / −68.5020 | +10.0203 / −68.5197 | +10.0118 / −68.5282 |
| Prism B³ | −38.1189 / −16.1189 | −38.0520 / −16.0520 | −37.8926 / −15.8926 |
| Prism B⁴ | −15.1544 / −39.9844 | −15.0771 / −39.9071 | −14.8912 / −39.7212 |
| Prism B⁵ | −43.0333 / −21.0333 | −42.9978 / −20.9978 | −42.9183 / −20.9183 |
| Rear air space | −32.7500 | −32.7500 | −32.7500 |

*Oblique ray trace −5.25*

| | C-ray | d-ray | F-ray |
|---|---|---|---|
| Front air space | +65.0113 | +65.0102 | +65.0064 |
| Prism B¹ | +34.1300 / +47.1600 | +34.0092 / +47.0392 | +33.7222 / +46.7522 |
| Prism B² | +51.8029 / +16.8029 | +51.7693 / +16.7693 | +51.7055 / +16.7055 |
| Middle air space | +25.8312 / −52.7088 | +25.8220 / −52.7180 | +25.8198 / −52.7202 |
| Prism B³ | −31.8582 / −9.8582 | −31.8053 / −9.8053 | −31.6779 / −9.6779 |
| Prism B⁴ | −9.2774 / −34.1074 | −9.2188 / −34.0488 | −9.0772 / −33.9072 |
| Prism B⁵ | −36.5494 / −14.5494 | −36.5255 / −14.5255 | −36.4718 / −14.4718 |
| Rear air space | −22.2500 | −22.2500 | −22.2500 |

In this example, the Abbé V number of the material of the front prism element of the front compound prism is low, 36.2, and each compound prism acts to deviate the F-ray more than the C-ray, the difference between such deviations amounting in each compound prism to .016 degree for an axial ray, so that the difference between the deviations in such case by the complete system is very small, amounting to .0003 of a degree. The corresponding difference between the deviations of the C and F rays by the complete system for oblique rays is also quite small, as will be clear from the third and fourth portions of the above table, the two values being .0031 and .0049.

The magnification of the front compound prism is × 1.47 and that of the rear compound prism × 1.35, the total magnification of the whole system being × 2.00.

The third example (shown in Figure 3) consists of two prism pairs, but with the prism elements arranged in an order different from that of the first example. Thus, in this example, the first and third prism elements are made of the same material with high Abbé V number and that of the material used for the second and fourth elements is low, the first and fourth elements having their apices pointing towards the closed side, whilst the apices of the second and third elements point away from the closed side.

EXAMPLE III

|  | $\theta$ | $N_C$ | $N_d$ | $N_F$ | V |
|---|---|---|---|---|---|
| Prism C¹ | 36.5 | 1.50727 | 1.50970 | 1.51518 | 64.4 |
| Prism C² | 21.9 | 1.60834 | 1.61323 | 1.62495 | 36.9 |
| Air Space | 93.2 |  |  |  |  |
| Prism C³ | 31.5 | 1.50727 | 1.50970 | 1.51518 | 64.4 |
| Prism C⁴ | 18.5 | 1.60834 | 1.61323 | 1.62495 | 36.9 |

*Axial ray trace*

|  | C-ray | d-ray | F-ray |
|---|---|---|---|
| Front air space | +55.7981 | +55.7959 | +55.7991 |
| Prism C¹ | +33.2789 / −3.2211 | +33.2174 / −3.2826 | +33.0833 / −3.4168 |
| Prism C² | −3.0185 / +18.9015 | −3.0717 / +18.8483 | −3.1857 / +18.7343 |
| Middle air space | +31.4000 / −61.7666 | +31.4112 / −61.7554 | +31.4599 / −61.7067 |
| Prism C³ | −35.7690 / −4.2690 | −35.6983 / −4.1983 | −35.5308 / −4.0308 |
| Prism C⁴ | −4.0003 / −22.4803 | −3.9284 / −22.4084 | −3.7581 / −22.2381 |
| Rear air space | −37.9500 | −37.9500 | −37.9500 |

*Oblique ray trace +5.25*

|  | C-ray | d-ray | F-ray |
|---|---|---|---|
| Front air space | +45.2245 | +45.2212 | +45.2330 |
| Prism C¹ | +28.0970 / −8.4030 | +28.0460 / −8.4540 | +27.9419 / −8.5581 |
| Prism C² | −7.8715 / +14.0285 | −7.9079 / +13.9921 | −7.9761 / +13.9239 |
| Middle air space | +22.9463 / −70.2537 | +22.9583 / −70.2417 | +23.0179 / −70.1821 |
| Prism C³ | −38.6410 / −7.1410 | −38.5639 / −7.0639 | −38.3819 / −6.8819 |
| Prism C⁴ | −6.6901 / −25.1901 | −6.6085 / −25.1085 | −6.4150 / −24.9150 |
| Rear air space | −43.2000 | −43.2000 | −43.2000 |

*Oblique ray trace −5.25*

|  | C-ray | d-ray | F-ray |
|---|---|---|---|
| Front air space | +66.6611 | +66.6620 | +66.6666 |
| Prism C¹ | +37.5292 / +1.0292 | +37.3016 / +0.9589 | +37.3016 / +0.8016 |
| Prism C² | +0.9645 / +22.8645 | +0.8974 / +22.7974 | +0.7475 / +22.6475 |
| Middle air space | +38.6768 / −54.5232 | +38.6883 / −54.5117 | +38.7338 / −54.4662 |
| Prism C³ | −32.7028 / −1.2028 | −32.6384 / −1.1384 | −32.4851 / −0.9851 |
| Prism C⁴ | −1.1272 / −19.6272 | −1.0653 / −19.5653 | −0.9185 / −19.4185 |
| Rear air space | −32.7000 | −32.7000 | −32.7000 |

In this example, each compound prism acts to deviate the C-ray more than the F-ray, the difference between such deviations for an axial ray amounting to .06 degree for each compound prism, the deviation difference for the whole system amounting to .001 degree. For the two sets of oblique rays, the deviation differences for the whole system amount to .0085 degree and .0055 degree respectively.

The magnification of the rear compound prism is × 1.46, the magnification of the complete system is × 2.00.

The fourth example (shown in Figure 4) again consists of two prism pairs, with yet another order for the prism elements, the first and fourth elements being made of the same material with relatively high Abbé V number, whilst the second and third elements are also made of the same material with lower Abbé V number, the Abbé V number difference being 27.5. The apices of the first and third elements point towards the closed side of the system, and those of the second and fourth elements point away from the closed side.

EXAMPLE IV

|  | $\theta$ | $N_C$ | $N_d$ | $N_F$ | V |
|---|---|---|---|---|---|
| Prism D¹ | 39.00 | 1.50727 | 1.50970 | 1.51518 | 64.4 |
| Prism D² | 20.75 | 1.60834 | 1.61323 | 1.62495 | 36.9 |
| Air space | 86.04 |  |  |  |  |
| Prism D³ | 11.10 | 1.60834 | 1.61323 | 1.62495 | 36.9 |
| Prism D⁴ | 26.00 | 1.50727 | 1.50970 | 1.51518 | 64.4 |

*Axial ray trace*

|  | C-ray | d-ray | F-ray |
|---|---|---|---|
| Front air space | +54.056 | +54.053 | +54.057 |
| Prism D¹ | +32.488 / −6.512 | +32.428 / −6.572 | +32.298 / −6.702 |
| Prism D² | −6.101 / +14.649 | −6.149 / +14.601 | −6.247 / +14.503 |
| Middle air space | +24.000 / −62.042 | +23.996 / −62.045 | +24.012 / −62.030 |
| Prism D³ | −33.312 / −44.412 | −33.199 / −44.299 | −32.923 / −44.024 |
| Prism D⁴ | −48.308 / −22.308 | −48.271 / −22.271 | −48.185 / −22.185 |
| Rear air space | −34.900 | −34.900 | −34.900 |

*Oblique ray trace +5.25*

|  | C-ray | d-ray | F-ray |
|---|---|---|---|
| Front air space | +43.1116 | +43.1046 | +43.1098 |
| Prism D¹ | +26.9631 / −12.0369 | +26.9124 / −12.0876 | +26.8101 / −12.1899 |
| Prism D² | −11.2702 / +9.4798 | −11.3013 / +9.4487 | −11.3551 / +9.3949 |
| Middle air space | +15.3606 / −70.6794 | +15.3572 / −70.6828 | +15.3821 / −70.6579 |
| Prism D³ | −35.9262 / −47.0262 | −35.8013 / −46.9013 | −35.4976 / −46.5976 |
| Prism D⁴ | −51.3272 / −25.3272 | −51.2836 / −25.2836 | −51.1857 / −25.1857 |
| Rear air space | −40.1500 | −40.1500 | −40.1500 |

*Oblique ray trace −5.25*

|  | C-ray | d-ray | F-ray |
|---|---|---|---|
| Front air space | +64.8700 | +64.8721 | +64.8777 |
| Prism D¹ | +36.9167 / −2.0833 | +36.8482 / −2.1518 | +36.6950 / −2.3050 |
| Prism D² | −1.9523 / +18.7977 | −2.0137 / +18.7363 | −2.1492 / +18.6008 |
| Middle air space | +31.2150 / −54.8250 | +31.2110 / −54.8290 | +31.2192 / −54.8208 |
| Prism D³ | −30.5456 / −41.6456 | −30.4448 / −41.5448 | −30.1989 / −41.2989 |
| Prism D⁴ | −45.1601 / −19.1601 | −45.1281 / −19.1281 | −45.0562 / −19.0562 |
| Rear air space | −29.6500 | −29.6500 | −29.6500 |

In this example, the C-ray is deviated more than the F-ray in each compound prism, the difference between such deviations for an axial ray being .012 degree in each case, with a total deviation difference for the complete system of .001 degree. For the two sets of oblique rays, the total deviation differences amount respectively to .0018 degree and to .0077 degree.

The magnification of the rear compound prism is × 1.47, and that of the complete system × 2.00.

It will be seen, from a comparison of the second, third and fourth portions of each table, that all four examples are well corrected for axial colour and also for oblique colour.

The second, third and fourth examples are not intended to be adjustable for variation of magnification, although in fact they are capable of such adjustment over a relatively small range.

The anamorphotic system according to the invention is primarily intended for use in front of a main objective, with a collimating lens system in front of the attachment in order to collimate the rays passing through the system, and Figures 5 and 7 illustrate Example I so arranged. Thus, the four prism elements, counting from the front, are indicated respectively at $A^1$, $A^2$, $A^3$ and $A^4$, the collimating lens system at B, and the main objective at C. The short conjugate plane is at D, close behind the main objective C at the rear focal plane thereof, and the long conjugate plane at E, at a distance in front of the front nodal plane of the collimating lens B equal to the focal length of the collimating lens.

If the system is used for the projection on to a screen of a laterally compressed image on a cinematograph film, the film will be located in the short conjugate plane D and the screen in the long conjugate plane E, and the system will act to broaden out the laterally compressed film image to give a screen image in its normal undistorted proportions. In this case the rays will pass through the system from the rear to the front in the manner above described.

If the system is used for photographing a broad panoramic scene on to a cinematograph film, the scene to be photographed will be at or near the long conjugate plane E and the film in the short conjugate plane D, and the system will act to produce on the film a laterally compressed image of the scene, suitable for subsequent projection in the manner just described to produce a screen image in the original proportions of the panoramic scene.

Figure 11:
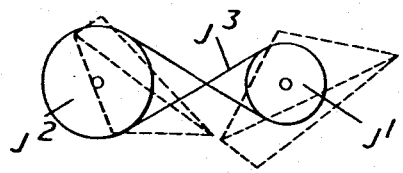

Figures 5 and 7 show Example I in its position of highest magnification within its adjustment range, that is $\times 1.97$, whilst Figures 6 and 8 show the same example in its position of lowest magnification within its range, namely $\times 1.08$. The adjustment of the two prism pairs may be controlled by two independent hand knobs, indicated respectively at $F^1$ and $F^2$, care being taken to make the two adjustments correspond appropriately to one another to ensure that an incident axial ray remains an axial ray in all positions of adjustment. If desired, however, the two hand controls may be combined together into a single control, with appropriate interconnecting mechanism to ensure the correct relationship between the movements of the two prism pairs. Figure 9 indicates by way of example a simple gear mechanism, consisting of two meshing gear wheels $G^1$ and $G^2$ respectively mounted on the pivot shafts of the two prism pairs, whilst Figure 10 indicates an alternative form of interconnecting mechanism comprising an arm $H^1$ on the pivot shaft of the first prism pair and a disc $H^2$ on the pivot shaft of the second prism pair, such disc having a cam slot $H^3$ in which a pin carried by the arm $H^1$ engages. Figure 11 shows a further alternative comprising two pulleys $J^1$ and $J^2$ respectively on the pivot shafts of the two prism pairs and an endless steel tape $J^3$ wrapped round the two pulleys.

The foregoing arrangements have been more particularly described for use in giving, in the case of photography, angular compression in the horizontal plane in relation to unchanged dimensions in the vertical plane, but it will be clear that by turning them through a right angle about the optical axis they can be made to give angular compression in the vertical plane with unchanged dimensions in the horizontal plane. A somewhat similar effect can be obtained by inverting the whole anamorphotic system from end to end, so that what was the rear now becomes the front. In this case, the system would give, for photography, angular expansion in the horizontal plane with unchanged dimensions in the vertical plane. By both turning the system through a right angle about the optical axis and also inverting it from end to end, an effect similar to the original effect is obtained, that is for photography angular expansion in the vertical plane with unchanged dimensions in the horizontal plane.

What I claim as my invention and desire to secure by Letters Patent is:

1. An anamorphotic optical system for modifying the cross-sectional shape of a collimated beam of light having components of a plurality of wave lengths, said system comprising two refracting compound prisms of which the first will deviate an incident ray in one sense and the second will deviate such ray in the reverse sense, and wherein the difference in each compound prism between the total prism angle deviating the rays in one sense and the total prism angle deviating the rays in the other sense departs from the value required for achromatism in relation to the characteristics of the materials used for the elements by an amount lying between 0.5 and 5.0 degrees, whereby for an axial ray which is deviated equally by the two compound prisms and emerges parallel to its direction of incidence the difference between the deviations of such ray by each compound prism for the C and F spectrum lines lies between .01 and 0.1 of a degree.

2. An anamorphotic optical system as claimed in claim 1, in which the rear compound prism includes more than two prism elements cemented together, the material of each of the outer elements thereof having Abbé V number greater than 45.

3. An anamorphotic optical system as claimed in claim 2, in which the rear compound prism comprises three prism elements cemented together, wherein the Abbé V number of the material of each of the outer elements exceeds that of the middle element by at least 10.

4. An anamorphotic optical system as claimed in claim 3, in which an axial ray is deviated by each compound prism more for the F spectrum line than for the C spectrum line, the front prism element of the front compound prism being made of material having Abbé V number less than 45.

5. An anamorphotic optical system as claimed in claim 4, in which the front compound prism comprises a cemented prism pair, in which the two prism elements have their apices pointing in opposite directions, the material of the front element of such prism pair being the same as that of the middle element of the rear compound prism, whilst the material of the rear element of the front compound prism is the same as that of both the outer elements of the rear compound prism.

6. An anamorphotic optical system as claimed in claim 1, in which an axial ray is deviated by each compound prism more for the F spectrum line than for the C spectrum line, the front prism element of the front compound prism being made of material having Abbé V number less than 45.

7. An anamorphotic optical system as claimed in claim 6, in which the front compound prism comprises a cemented prism pair, in which the two prism elements have their apices pointing in opposite directions, the Abbé V number of the material of the rear prism element of such pair exceeding that of the associated front element by at least 10.

8. An anamorphotic optical system as claimed in claim 7, having means for angularly adjusting the two compound prisms respectively about two axes parallel to the generators of the prisms.

9. An anamorphotic optical system as claimed in claim 8, in which the rear compound prism comprises a cemented prism pair, in which the two prism elements have their apices pointing in opposite directions, the front element of such pair having its apex pointing in the same direction as that of the rear element of the front prism pair, the portion of an axial ray within each prism element being inclined to the normal to the cemented surface at an angle which exceeds by at least five degrees the angle between such ray portion and the adjacent air-exposed surface of the prism element.

10. An anamorphotic optical system as claimed in claim 1, in which the rear compound prism comprises a cemented prism pair, in which the two prism elements have their apices pointing in opposite directions, the front element of such pair having its apex pointing in the same direction as that of the rear element of the front prism pair, the portion of an axial ray within each prism element being inclined to the normal to the cemented surface at an angle which exceeds by at least five degrees the angle between such ray portion and the adjacent air-exposed surface of the prism element.

11. An anamorphotic optical system as claimed in claim 10, having means for angularly adjusting the two compound prisms respectively about two axes parallel to the generators of the prisms.

12. An anamorphotic optical system for modifying the cross-sectional shape of a collimated beam of light having components of more than one wave length, said system comprising two refracting compound prisms of which the first will deviate an incident ray in one sense and the second will deviate such ray in the reverse sense, the front prism element of the front compound prism being made of a material having Abbé V number greater than 45, and means for maintaining the angular relationship of said compound prisms, whereby for an axial ray which is deviated equally by the two compound prisms and emerges parallel to its direction of incidence the deviation of such ray by each compound prism for the C spectrum line exceeds by between .01 and 0.1 of a degree the deviation of such ray for the F spectrum line.

13. An anamorphotic optical system as claimed in claim 12, in which the front compound prism consists of a cemented prism pair in which the two prism elements have their apices pointing in opposite directions, the Abbé V number of the material of the front prism element of such pair exceeding that of the associated rear prism element by at least 10.

14. An anamorphotic optical system as claimed in claim 13, in which the rear compound prism consists of a cemented prism pair in which the two prism elements have their apices pointing in opposite directions and the Abbé V number of the material of the front prism element of such pair exceeds that of the associated rear prism element by at least 10, the apices of the rear element of the front prism pair and of the front element of the rear prism pair both pointing away from the apex of the prismatic air space between the two prism pairs.

15. An anamorphotic optical system as claimed in claim 13, in which the rear compound prism consists of a cemented prism pair in which the two prism elements have their apices pointing in opposite directions, the Abbé V number of the material of the rear prism element of such pair exceeding that of the material of the associated front prism element by at least 10, the apices of the front prism elements of the two prism pairs both pointing away from the apex of the prismatic air space between the two prism pairs.

16. An anamorphotic optical system for use in a substantially collimated beam of light, comprising two refracting compound prisms with a prismatic air space between them, the vertex line of intersection of the planes of the outer surfaces of the front compound prism lying on the same side of the system as the vertex line of the prismatic air space, whilst the vertex line of intersection of the planes of the outer surfaces of the rear compound prism lies on the side of the system opposite to the vertex line of the prismatic air space, whereby one compound prism will deviate an incident ray in one sense and the other will deviate such ray in the opposite sense, and wherein the front compound prism comprises two prism elements such that the value of the quantity $(N_F - N_C) \sin \theta$ for the rear element exceeds the value of the corresponding quantity for the front element by between 15 and 55 percent, whilst the absolute value of the sum of the algebraic values of such quantity for all the prism elements of the system is less than one-tenth of the sum of the numerical values of such quantity for all the prism elements of the system (where $N_F$ and $N_C$ are the refractive indices respectively for the F spectrum line and for the C spectrum line of the material of which the element is made and $\theta$ is the prism angle of the element), whereby for an axial ray which is deviated equally by the two compound prisms and emerges parallel to its direction of incidence the difference between the deviations of such ray by each compound prism for the C and F spectrum lines lies between .01 and 0.1 of a degree.

17. An anamorphotic optical system as claimed in claim 16 wherein the front prism element of the front compound prism is made of a material having Abbé V number less than 45 and the rear prism element of said front compound prism is made of a material having Abbé V number exceeding that of said front prism element by at least 10, whereby the deviation of the F spectrum line is greater than that of the C spectrum line.

18. An anamorphotic optical system as claimed in claim 16 wherein the front prism element of the front compound prism is made of a material having Abbé V number greater than 45 and exceeds that of the material of the rear prism element of said front compound prism by at least 10, whereby the deviation of the C spectrum line is greater than that of the F spectrum line.

19. An anamorphotic optical system as claimed in claim 16 wherein the rear compound prism includes more than two prism elements, the material of each of the outer elements thereof having Abbé V number greater than 45 and exceeding that of an inner element by at least 10.

20. An anamorphotic optical system as claimed in claim 16 having means for simultaneously adjusting the two compound prisms angularly about two axes respectively parallel to the generators of said prisms, and means for limiting said angular adjustment to a range of magnification of between 1.08 and 1.97.

References Cited in the file of this patent

UNITED STATES PATENTS

| Number | Name | Date |
|---|---|---|
| 818,553 | Phillips | Apr. 24, 1906 |
| 1,307,598 | Phillips | June 24, 1919 |
| 1,758,801 | Moses | May 13, 1930 |
| 1,898,787 | Newcomer | Feb. 21, 1933 |
| 1,918,488 | Rackett | July 18, 1933 |
| 1,931,992 | Newcomer | Oct. 24, 1933 |
| 1,932,082 | Newcomer | Oct. 24, 1933 |
| 2,048,284 | Newcomer | July 21, 1936 |

FOREIGN PATENTS

| Number | Country | Date |
|---|---|---|
| 338,962 | Great Britain | Dec. 1, 1930 |